(12) United States Patent
Simeonov et al.

(10) Patent No.: US 11,900,099 B2
(45) Date of Patent: Feb. 13, 2024

(54) REDUCED DOWNTIME DURING UPGRADE OF AN APPLICATION HOSTED IN A DATA CENTER

(71) Applicant: VMWARE, INC., Palo Alto, CA (US)

(72) Inventors: Tomo Vladimirov Simeonov, Sofia (BG); Ivaylo Radoslavov Radev, Sofia (BG); Roman Romanov Petrov, Sofia (BG); George Daskalov, Sofia (BG); Andrey Karabelyov, Sofia (BG); Dimitar Dimitrov, Sofia (BG); Denis Denislavov Belinov, Varna (BG); Vladislav Milenov Atanasov, Sofia (BG); Ramesh Vepuri Lakshminarayana, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 99 days.

(21) Appl. No.: 17/741,496

(22) Filed: May 11, 2022

(65) Prior Publication Data
US 2023/0106877 A1    Apr. 6, 2023

Related U.S. Application Data

(60) Provisional application No. 63/252,125, filed on Oct. 4, 2021.

(30) Foreign Application Priority Data

Jan. 21, 2022 (IN) .............................. 202244003512

(51) Int. Cl.
G06F 8/65 (2018.01)
(52) U.S. Cl.
CPC ..................................... G06F 8/65 (2013.01)

(58) Field of Classification Search
None
See application file for complete search history.

(56) References Cited

U.S. PATENT DOCUMENTS 10,838,712 B1 *  11/2020  Mukhopadhyay ........ G06F 8/61
11,074,166 B1 *  7/2021   Aletty ................. G06F 11/3688
(Continued)

OTHER PUBLICATIONS

Janssen, Thorben "Update your Database Schema Without Downtime," Oct. 4, 2021, 19 pages, Retrieved from the Internet, URL: https://thorben-janssen.com/update-database-schema-without-downtime/.

(Continued)

Primary Examiner — Qing Chen
(74) Attorney, Agent, or Firm — Kim & Stewart LLP

(57) ABSTRACT

A method of upgrading an application in a software-defined data center (SDDC) includes: deploying, by lifecycle management software executing in the SDDC, a second appliance, a first appliance executing services of the application at a first version, the second appliance having services of the application at a second version, the services in the first appliance being active and the services in the second appliance being inactive; expanding, by the lifecycle management software, state of the first appliance to support both the services at the first version and the services at the second version; replicating, by the lifecycle management software, the state of the first appliance to the second appliance; performing, by the lifecycle management software, a switchover to stop the services of the first appliance and start the services of the second appliance; and contracting, by the lifecycle management software, state of the second appliance to remove a portion unused by the services at the second version.

20 Claims, 6 Drawing Sheets

(56) References Cited

U.S. PATENT DOCUMENTS

| | | |
|---|---|---|
| 11,269,620 B1 | 3/2022 | Hoeft et al. |
| 2020/0159852 A1 | 5/2020 | Meissner et al. |
| 2022/0276858 A1* | 9/2022 | Stumpf ............... G06F 12/0815 |

OTHER PUBLICATIONS

Sato, Danilo "ParallelChange," May 13, 2014, 7 pages, Retrieved from the Internet, URL: https://martinfowler.com/bliki/ParallelChange.html.

VMware, Inc. "Using Blue-Green Deployment to Reduce Downtime and Risk," Tanzu Docs, Pivotal Platform v2.7, Apr. 2, 2019, 6 pages, Retrieved from the Internet, URL: https://docs.pivotal.io/application-service/2-7/devguide/deploy-apps/blue-green.html.

Unpublished U.S. Appl. No. 17/464,733, filed Sep. 2, 2021, 21 pages.

Janssen, Thorben "Update your Database Schema Without Downtime," Aug. 7, 2020, pp. 1-11 (Year: 2020).

Non-Final Office Action dated Mar. 30, 2023 in U.S. Appl. No. 17/550,388, 27 pages.

International Search Report and Written Opinion dated Jan. 30, 2023 in International Application No. PCT/US2022/045567, 13 pages.

\* cited by examiner

REDUCED DOWNTIME DURING UPGRADE OF AN APPLICATION HOSTED IN A DATA CENTER

CROSS-REFERENCE TO RELATED APPLICATIONS

Benefit is claimed under 35 U.S.C. 119(a)-(d) to Foreign Application Serial No. 202244003512 filed in India entitled "REDUCED DOWNTIME DURING UPGRADE OF AN APPLICATION HOSTED IN A DATA CENTER", on Jan. 21, 2022, by VMware, Inc., which is herein incorporated in its entirety by reference for all purposes.

This application claims priority to U.S. Provisional Patent Application Ser. No. 63/252,125, filed Oct. 4, 2021, which is incorporated by reference herein.

BACKGROUND

In a software-defined data center (SDDC), virtual infrastructure, which includes virtual compute, storage, and networking resources, is provisioned from hardware infrastructure that includes a plurality of host computers, storage devices, and networking devices. The provisioning of the virtual infrastructure is carried out by management software that communicates with virtualization software (e.g., hypervisor) installed in the host computers.

As described in U.S. patent application Ser. No. 17/464,733, filed on Sep. 2, 2021, the entire contents of which are incorporated by reference herein, the desired state of the SDDC, which specifies the configuration of the SDDC (e.g., the number of clusters, the hosts that each cluster would manage, and whether or not certain features, such as distributed resource scheduling, high availability, and workload control plane, are enabled), may be defined in a declarative document, and the SDDC is deployed or upgraded according to the desired state defined in the declarative document.

The declarative approach has simplified the deployment and upgrading of the SDDC configuration, but may still be insufficient by itself to meet the needs of customers who have multiple SDDCs deployed across different geographical regions, and deployed in a hybrid manner, e.g., on-premise, in a public cloud, or as a service. These customers want to ensure that all of their SDDCs are compliant with company policies and are looking for an easier way to monitor their SDDCs for compliance with the company policies and manage the upgrade and remediation of such SDDCs.

Today's applications executing in an SDDC require always-on access. This mandates upgrade downtime for applications to be reduced from hours to minutes, particularly when such applications require frequent upgrades. In addition, it is desirable to provide a way to revert the application to a stable state should an upgrade fail. Thus, there is a need to reduce downtime during upgrade of an application hosted in an SDDC.

SUMMARY

In an embodiment, a method of upgrading an application in a software-defined data center (SDDC) includes: deploying, by lifecycle management software executing in the SDDC, a second appliance, a first appliance executing services of the application at a first version, the second appliance having services of the application at a second version, the services in the first appliance being active and the services in the second appliance being inactive; expanding, by the lifecycle management software, state of the first appliance to support both the services at the first version and the services at the second version; replicating, by the lifecycle management software, the state of the first appliance to the second appliance; performing, by the lifecycle management software, a switchover to stop the services of the first appliance and start the services of the second appliance; and contracting, by the lifecycle management software, state of the second appliance to remove a portion unused by the services at the second version.

Further embodiments include a non-transitory computer-readable storage medium comprising instructions that cause a computer system to carry out the above method, as well as a computer system configured to carry out the above method.

DETAILED DESCRIPTION

One or more embodiments employ a cloud control plane for managing the configuration of SDDCs, which may be of different types and which may be deployed across different geographical regions, according to a desired state of the SDDC defined in a declarative document referred to herein as a desired state document. The cloud control plane is responsible for generating the desired state and specifying configuration operations to be carried out in the SDDCs according to the desired state. Thereafter, configuration agents running locally in the SDDCs establish cloud inbound connections with the cloud control plane to acquire the desired state and the configuration operations to be carried out, and delegate the execution of these configuration operations to services running in a local SDDC control plane.

Figure 1:
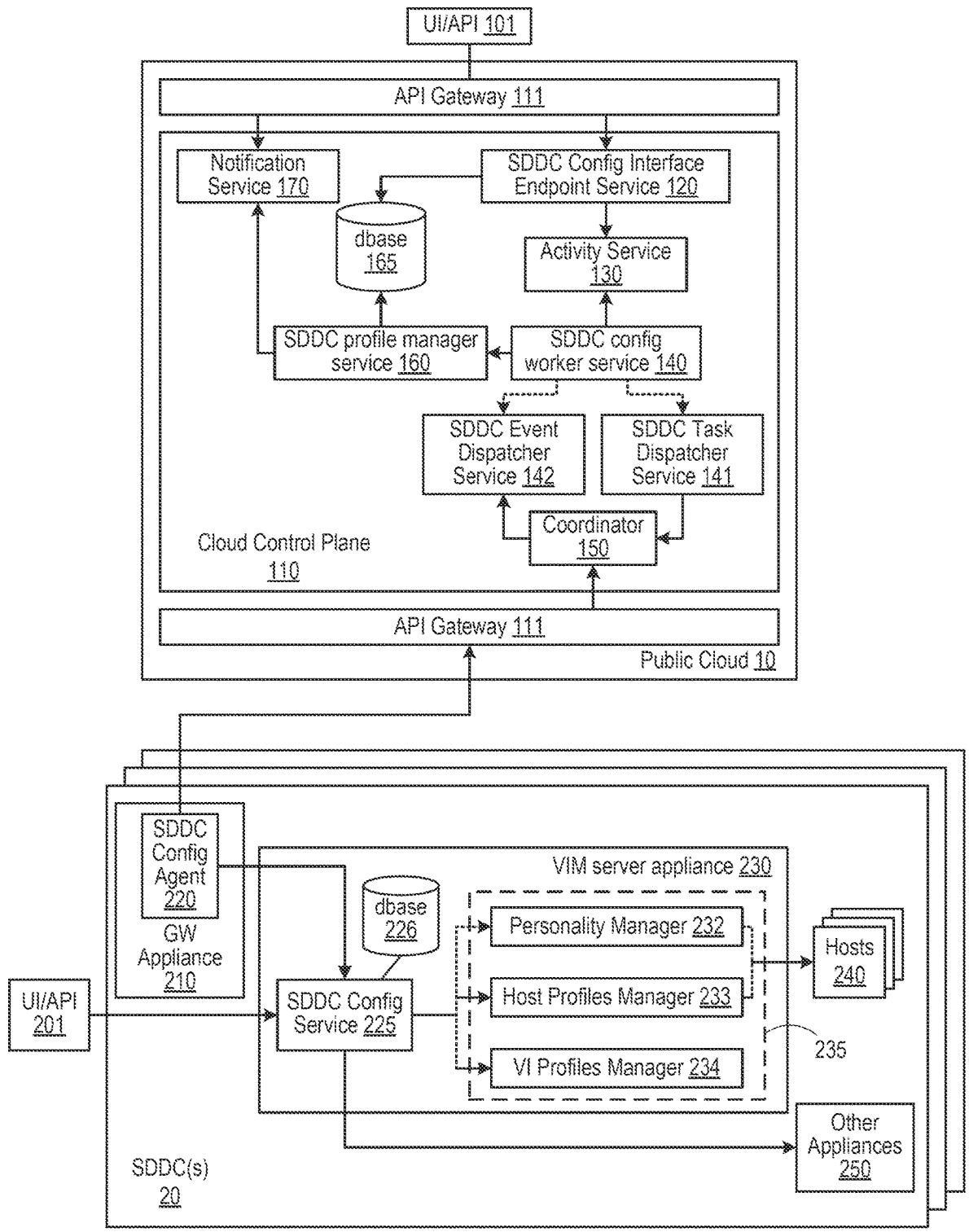
FIG. 1 depicts a cloud control plane implemented in a public cloud, and a plurality of SDDCs that are managed through the cloud control plane, according to embodiments.

FIG. 1 depicts a cloud control plane 110 implemented in a public cloud 10, and a plurality of SDDCs 20 that are managed through cloud control plane 110. In the embodiment illustrated herein, cloud control plane 110 is accessible by multiple tenants through UI/API 101 and each of the different tenants manage a group of SDDCs through cloud control plane 110 according to a desired state of the SDDCs that the tenant defines in a desired state document. In the following description, a group of SDDCs of one particular tenant is depicted as SDDCs 20, and to simplify the description, the operation of cloud control plane 110 will be described with respect to management of SDDCs 20. However, it should be understood that the SDDCs of other tenants have the same appliances, software products, and services running therein as SDDCs 20, and are managed through cloud control plane 110 in the same manner as described below for SDDCs 20.

A user interface (UI) or an application programming interface (API) that interacts with cloud control plane 110 is depicted in FIG. 1 as UI/API 101. Through UI/API 101, an administrator of SDDCs 20 can issue commands to: (1) get the desired state or the running state of any of SDDCs 20; (2) create the desired state of SDDCs 20, e.g., by specifying a location of the desired state document or specifying the running state of one of SDDCs 20 to be used as the desired state of all SDDCs 20; (3) perform a compliance check of SDDCs against the desired state; and (4) apply the desired state to SDDCs 20.

Cloud control plane 110 represents a group of services running in virtual infrastructure of public cloud 10 that interact with each other to provide a control plane through which the administrator of SDDCs 20 can manage the desired state of SDDCs 20 by issuing commands through UI/API 101. API gateway 111 is also a service running in the virtual infrastructure of public cloud 10 and this service is responsible for routing cloud inbound connections to the proper service in cloud control plane 110, e.g., SDDC configuration interface endpoint service 120, notification service 170, or coordinator 150.

SDDC configuration interface endpoint service 120 is responsible for accepting commands made through UI/API 101 and returning the result to UI/API 101. An operation requested in the commands can be either synchronous or asynchronous. Asynchronous operations are stored in activity service 130, which keeps track of the progress of the operation, and an activity ID, which can be used to poll for the result of the operation, is returned to UI/API 101. If the operation targets multiple SDDCs 20, SDDC configuration interface endpoint service 120 creates an activity which has children activities. SDDC configuration worker service 140 processes these children activities independently and respectively for multiple SDDCs 20, and activity service 130 tracks these children activities according to results returned by SDDC configuration worker service 140.

SDDC configuration worker service 140 polls activity service 130 for new operations and processes them by passing the tasks to be executed to SDDC task dispatcher service 141. SDDC configuration worker service 140 then polls SDDC task dispatcher service 141 for results and notifies activity service 130 of the results. SDDC configuration worker service 140 also polls SDDC event dispatcher service 142 for events posted to SDDC event dispatcher service 142 and handles these events based on the event type. Examples of events posted to SDDC event dispatcher service 142 include a change event, where "a local change has been made to the desired state of an SDDC" and a drift event, where "the running state of SDDC is out of compliance with its desired state."

SDDC task dispatcher service 141 routes each task passed thereto by SDDC configuration worker service 140, to coordinator 150 and tracks the progress of the task by polling coordinator 150. Coordinator 150 accepts cloud inbound connections, which are routed through API gateway 111, from SDDC configuration agents 220. SDDC configuration agents 220 are responsible for orchestrating the execution of the tasks routed to coordinator 150 in their respective SDDCs 20. Upon completion of the tasks, SDDC configuration agents 220 return results to coordinator 150 through the cloud inbound connections. SDDC configuration agents 220 also notify coordinator 150 of various events through the cloud inbound connections, and coordinator 150 in turn posts these events to SDDC event dispatcher service 142 for handling by SDDC configuration worker service 140.

SDDC profile manager service 160 is responsible for storing the desired state documents in database 165 and, for each of SDDCs 20, tracks the history of the desired state document associated therewith and any drift in its running state from the desired state specified in its desired state document. Accordingly, when SDDC configuration agent 220 of an SDDC notifies coordinator 150 of a change event, and coordinator 150 posts the change event to SDDC event dispatcher service 142, SDDC configuration worker service 140 calls SDDC profile manager service 160 to record the change to the desired state of the SDDC in database 165. Similarly, when SDDC configuration agent 220 of an SDDC notifies coordinator 150 of a drift event, and coordinator 150 posts the drift event to SDDC event dispatcher service 142, SDDC configuration worker service 140 calls SDDC profile manager service 160 to record the drift in the running state of the SDDC from the desired state in database 165. Thereafter, SDDC profile manager service 160 posts notifications about any changes made to database 165 to notification service 170, and the administrator can get such notifications through UI/API 101.

An operation requested in the commands made through UI/API 101 may be synchronous, instead of asynchronous. An operation is synchronous if there is a specific time window within which the operation must be completed. Examples of a synchronous operation include an operation to get the desired state of an SDDC or an operation to get SDDCs that are associated with a particular desired state. In the embodiments, to enable such operations to be completed within the specific time window, SDDC configuration interface endpoint service 120 has direct access to database 165.

As described above, a plurality of SDDCs 20, which may be of different types and which may be deployed across different geographical regions, is managed through cloud control plane 110. In one example, one of SDDCs 20 is deployed in a private data center of the customer and another one of SDDCs 20 is deployed in a public cloud, and all of SDDCs are located in different geographical regions so that they would not be subject to the same natural disasters, such as hurricanes, fires, and earthquakes.

Any of the services of described above may be a microservice that is implemented as a container image executed on the virtual infrastructure of public cloud 10 (and/or private cloud). In one embodiment, each of the services described above is implemented as one or more container images running within a Kubernetes® pod.

In each SDDC 20, regardless of its type and location, a gateway appliance 210 and virtual infrastructure management (VIM) appliance 230 are provisioned from the virtual resources of SDDC 20. Gateway appliance 210 is able to establish connections with cloud control plane 110 and a local control plane of SDDC 20. In particular, SDDC configuration agent 220 running in gateway appliance 210 communicates with coordinator 150 to retrieve the tasks (e.g., various SDDC configuration actions, such as check compliance against desired state and apply desired state) that were routed to coordinator 150 for execution in SDDC 20 and delegates the tasks to SDDC configuration service 225 running in VIM server appliance 230. After the execution of these tasks have completed, SDDC configuration agent 220 sends back the execution result to coordinator 150.

SDDC configuration service 225 is responsible for passing on the tasks delegated by SDDC configuration agent 220 to the local control plane of SDDC 20, which includes: (1) a personality manager 232, which is responsible for applying the desired image of the virtualization software to a cluster of hosts 240 according to the desired state; (2) host profiles manager 233, which is responsible for applying the desired configurations of the cluster of hosts 240 according to the desired state; (3) virtual infrastructure (VI) profiles manager 234, which is responsible for applying the desired configuration of the virtual infrastructure managed by VIM server appliance 230 (e.g., the number of clusters, the hosts that each cluster would manage, etc.) and other appliances 250 (e.g., appliance that hosts the network virtualization software product), and the desired configuration of various features provided by software products running in VIM server appliance 230 (e.g., distributed resource scheduling, high availability, and workload control plane), according to the desired state. In one embodiment, SDDC configuration service 225 is implemented as one or more container images running within a Kubernetes pod. In embodiments, personality manager 232, host profiles manager 233, and VI profiles manager 234 comprise a lifecycle manager (LCM) 235.

The desired state is defined in a desired state document stored in database 226 and may be specified in the tasks retrieved from coordinator 150 and delegated to SDDC configuration service 225 or specified by the administrator of SDDCs 20 through UI/API 201. If the desired state is specified by the administrator of SDDCs 20 through UI/API 201, SDDC configuration agent 220 notifies coordinator 150 of this change event, i.e., that "a local change has been made to the desired state of an SDDC."

SDDC configuration service 225 performs a compliance check of the running state of SDDC 20 against the desired state, both periodically and in response to a "compliance check" task retrieved from coordinator 150 and delegated to SDDC configuration service 225. If a drift of the running state of SDDC 20 from the desired state is detected as a result of this compliance check, SDDC configuration agent 220 notifies coordinator 150 of this drift event, i.e., that "the running state of SDDC is out of compliance with its desired state."

Figure 2:
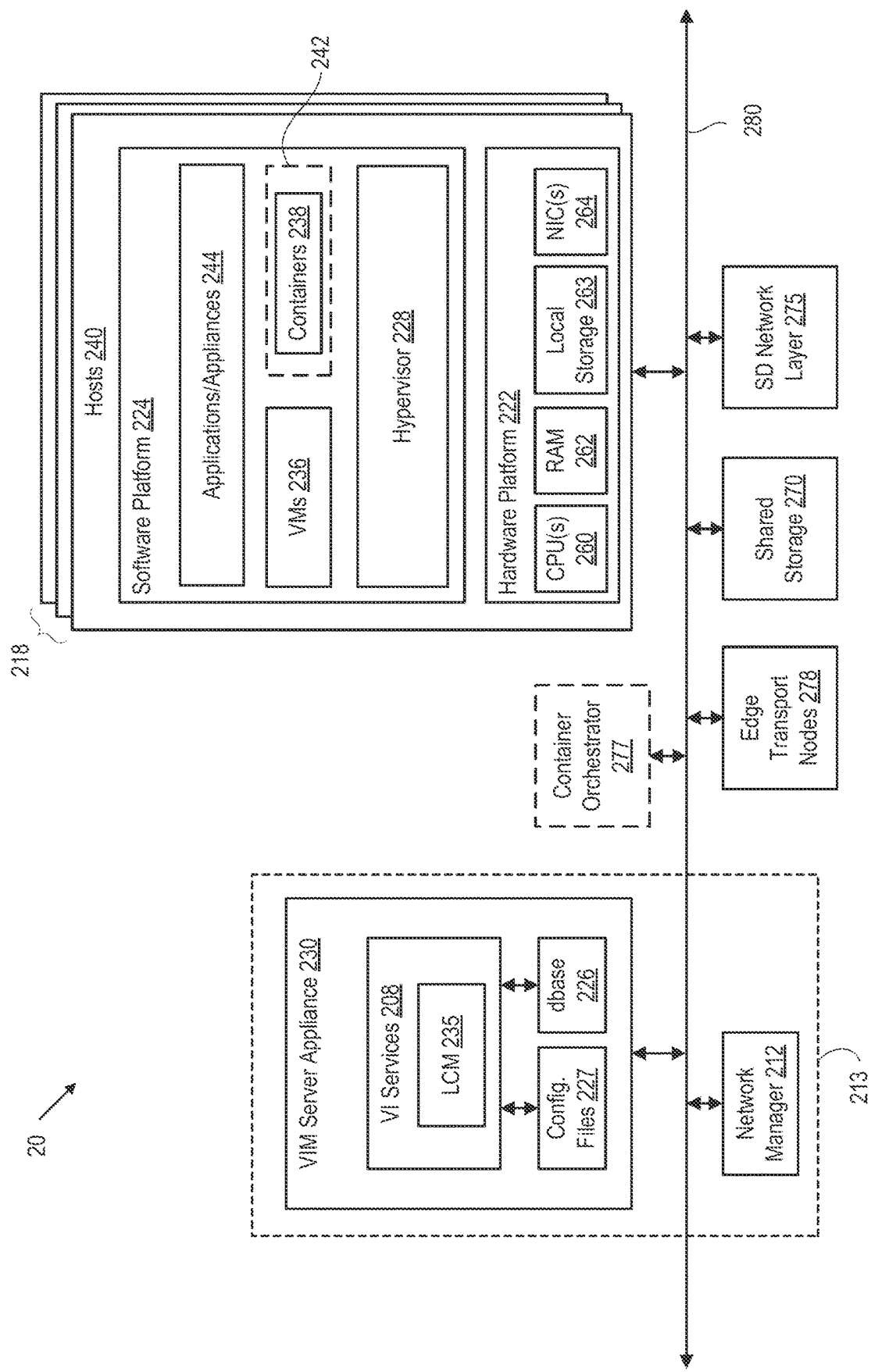
FIG. 2 is a block diagram of an SDDC in which embodiments described herein may be implemented.

FIG. 2 is a block diagram of an SDDC 20 in which embodiments described herein may be implemented. SDDC 20 includes a cluster of hosts 240 ("host cluster 218") that may be constructed on server-grade hardware platforms such as an x86 architecture platforms. For purposes of clarity, only one host cluster 218 is shown. However, SDDC 20 can include many of such host clusters 218. As shown, a hardware platform 222 of each host 240 includes conventional components of a computing device, such as one or more central processing units (CPUs) 260, system memory (e.g., random access memory (RAM) 262), one or more network interface controllers (NICs) 264, and optionally local storage 263. CPUs 260 are configured to execute instructions, for example, executable instructions that perform one or more operations described herein, which may be stored in RAM 262. NICs 264 enable host 240 to communicate with other devices through a physical network 280. Physical network 280 enables communication between hosts 240 and between other components and hosts 240 (other components discussed further herein).

In the embodiment illustrated in FIG. 2, hosts 240 access shared storage 270 by using NICs 264 to connect to network 280. In another embodiment, each host 240 contains a host bus adapter (HBA) through which input/output operations (IOs) are sent to shared storage 270 over a separate network (e.g., a fibre channel (FC) network). Shared storage 270 include one or more storage arrays, such as a storage area network (SAN), network attached storage (NAS), or the like. Shared storage 270 may comprise magnetic disks, solid-state disks, flash memory, and the like as well as combinations thereof. In some embodiments, hosts 240 include local storage 263 (e.g., hard disk drives, solid-state drives, etc.). Local storage 263 in each host 240 can be aggregated and provisioned as part of a virtual SAN (vSAN), which is another form of shared storage 270.

A software platform 224 of each host 240 provides a virtualization layer, referred to herein as a hypervisor 228, which directly executes on hardware platform 222. In an embodiment, there is no intervening software, such as a host operating system (OS), between hypervisor 228 and hardware platform 222. Thus, hypervisor 228 is a Type-1 hypervisor (also known as a "bare-metal" hypervisor). As a result, the virtualization layer in host cluster 218 (collectively hypervisors 228) is a bare-metal virtualization layer executing directly on host hardware platforms. Hypervisor 228 abstracts processor, memory, storage, and network resources of hardware platform 222 to provide a virtual machine execution space within which multiple virtual machines (VM) 236 may be concurrently instantiated and executed. One example of hypervisor 228 that may be configured and used in embodiments described herein is a VMware ESXi™ hypervisor provided as part of the VMware vSphere® solution made commercially available by VMware, Inc. of Palo Alto, CA Applications and/or appliances 244 execute in VMs 236 and/or containers 238 (discussed below).

Host cluster 218 is configured with a software-defined (SD) network layer 275. SD network layer 275 includes logical network services executing on virtualized infrastructure in host cluster 218. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches and logical routers, as well as logical firewalls, logical virtual private networks (VPNs), logical load balancers, and the like, implemented on top of the virtualized infrastructure. In embodiments, SDDC 20 includes edge transport nodes 278 that provide an interface of host cluster 218 to a wide area network (WAN) (e.g., a corporate network, the public Internet, etc.).

VIM server appliance 230 is a physical or virtual server that manages host cluster 218 and the virtualization layer therein. VM server appliance 230 installs agent(s) in hypervisor 228 to add a host 240 as a managed entity. VM server appliance 230 logically groups hosts 240 into host cluster 218 to provide cluster-level functions to hosts 240, such as VM migration between hosts 240 (e.g., for load balancing), distributed power management, dynamic VM placement according to affinity and anti-affinity rules, and high-availability. The number of hosts 240 in host cluster 218 may be one or many. VM server appliance 230 can manage more than one host cluster 218.

In an embodiment, SDDC 20 further includes a network manager 212. Network manager 212 is a physical or virtual server that orchestrates SD network layer 275. In an embodiment, network manager 212 comprises one or more virtual servers deployed as VMs, Network manager 212 installs additional agents in hypervisor 228 to add a host 240 as a managed entity, referred to as a transport node. In this manner, host cluster 218 can be a cluster of transport nodes.

One example of an SD networking platform that can be configured and used in embodiments described herein as network manager 212 and SD network layer 275 is a VMware NSX® platform made commercially available by VMware, Inc. of Palo Alto, CA.

VIM server appliance 230 and network manager 212 comprise a virtual infrastructure (VI) control plane 213 of SDDC 20. VIM server appliance 230 can include various VI services 208. VI services 208 include various virtualization management services, such as a distributed resource scheduler (DRS), high-availability (HA) service, single sign-on (SSO) service, virtualization management daemon, and the like. An SSO service, for example, can include a security token service, administration server, directory service, identity management service, and the like configured to implement an SSO platform for authenticating users. VI services 208 can further include LCM 235. VI services 208 store and/or use state in database 226 and configuration (config) files 227.

In embodiments, SDDC 20 can include a container orchestrator 277. Container orchestrator 277 implements an orchestration control plane, such as Kubernetes®, to deploy and manage applications or services thereof on host cluster 218 using containers 238. In embodiments, hypervisor 228 can support containers 238 executing directly thereon. In other embodiments, containers 238 are deployed in VMs 236 or in specialized VMs referred to as "pod VMs 242." A pod VM 242 is a VM that includes a kernel and container engine that supports execution of containers, as well as an agent (referred to as a pod VM agent) that cooperates with a controller executing in hypervisor 228 (referred to as a pod VIM controller). Container orchestrator 277 can include one or more master servers configured to command and configure pod VM controllers in host cluster 218. Master servers) can be physical computers attached to network 280 or VMs 236 in host cluster 218.

Figure 3:
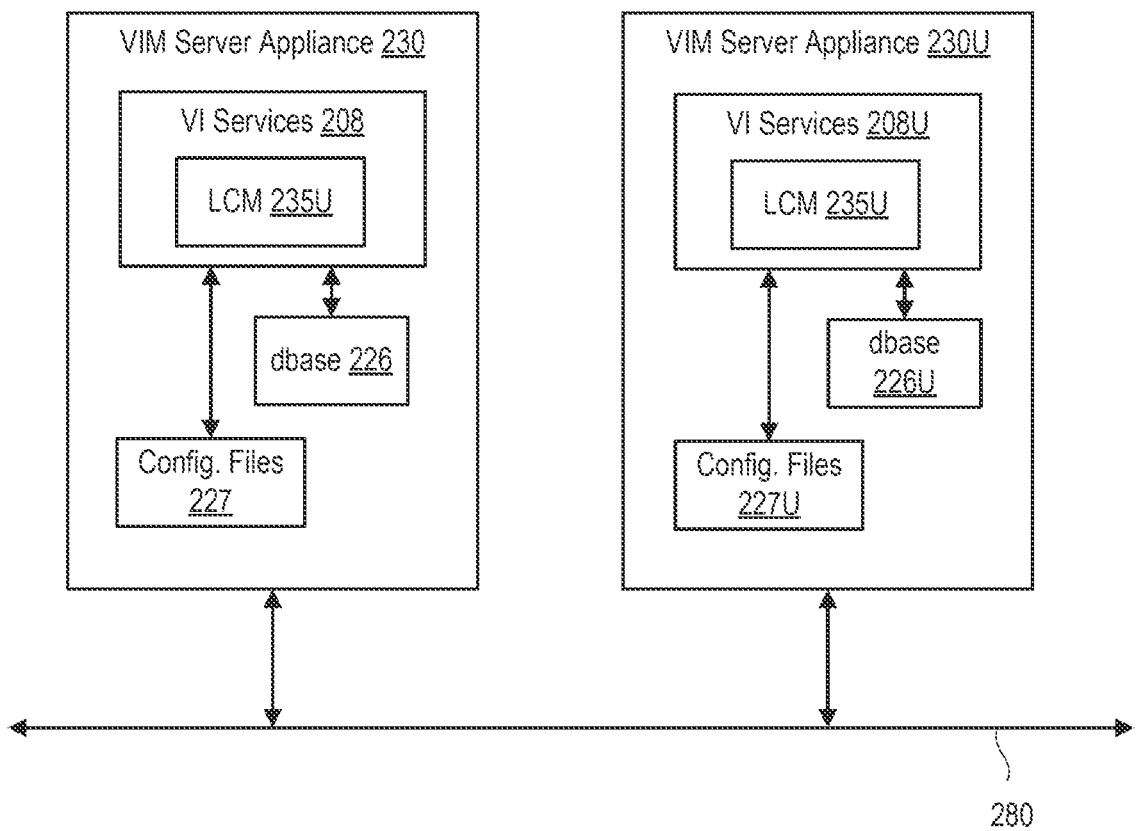
FIG. 3 is a block diagram depicting a VIM server appliance during an upgrade operation according to embodiments.

FIG. 3 is a block diagram depicting VIM server appliance 230 during an upgrade operation according to embodiments. During an upgrade, VIM server appliance 230 executes and an upgraded VM server appliance 230U is deployed and running but inactive. That is, VI services 208 are active and executing while VI services 208U are inactive. VI services 208U are upgraded with respect to VI services 208. In addition, a database 226U in VIM server appliance 230U is an empty database set up to receive data replication from database 226. In embodiments, LCM 235 in VIM server appliance 230 is upgraded in-place such that each of VIM server appliance 230 and VIM server appliance 230U executes an upgraded LCM 235U. LCM 235U in each of VIM service appliances 230 and 230U are collectively referred to as LCM software.

The LCM software is configured to perform the upgrade process, which includes the following phases: (1) the expand phase; (2) the switchover phase; and (3) the contract phase. During the expand phase, LCM 235U expands database 226 to support both the deprecated and upgraded schemas, where the schema of database 226 is referred to as the "deprecated scheme" and the schema of database 226U is referred to as the "upgraded schema." VI services 208 continue to be active and execute while database 226 is expanded and can continue to interface with database 226, since the deprecated schema is still supported. LCM 235U can also expand one or more configuration files 227 if supported. After database 226 is expanded, LCM 235U replicates database 226 to database 226U and configuration files 227 to configuration files 227U. During the switchover phase, LCM 235 deactivates VI services 208 and activates VI services 208U. During the contract phase, LCM 235U contracts database 226U to remove deprecated portions of the schema (e.g., after contraction, database 226U supports only the upgraded schema). VI services 208U are active and execute during the contract phase. LCM 235U can also contract any configuration files 227U that were expanded in the expand phase.

Figure 4:
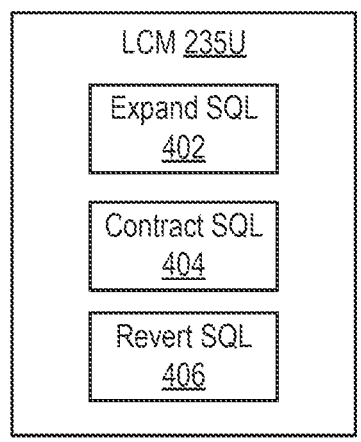
FIG. 4 is a block diagram depicting lifecycle management software according to an embodiment.

FIG. 4 is a block diagram depicting LCM 235U according to an embodiment. LCM 235U include expand structured query language (SQL) code 402, contract SQL code 404, and revert SQL code 406. LCM 235U executes expand SQL code 402 to perform the expand phase of database 226. LCM 235U executes contract SQL code 404 to perform the contract phase of database 226U. Revert SQL 406 includes reciprocal SQL code of expand SQL code. LCM 235U can execute revert SQL 406 to perform a revert/rollback of the expansion of database 226 in case of a failure for example.

Figure 5:
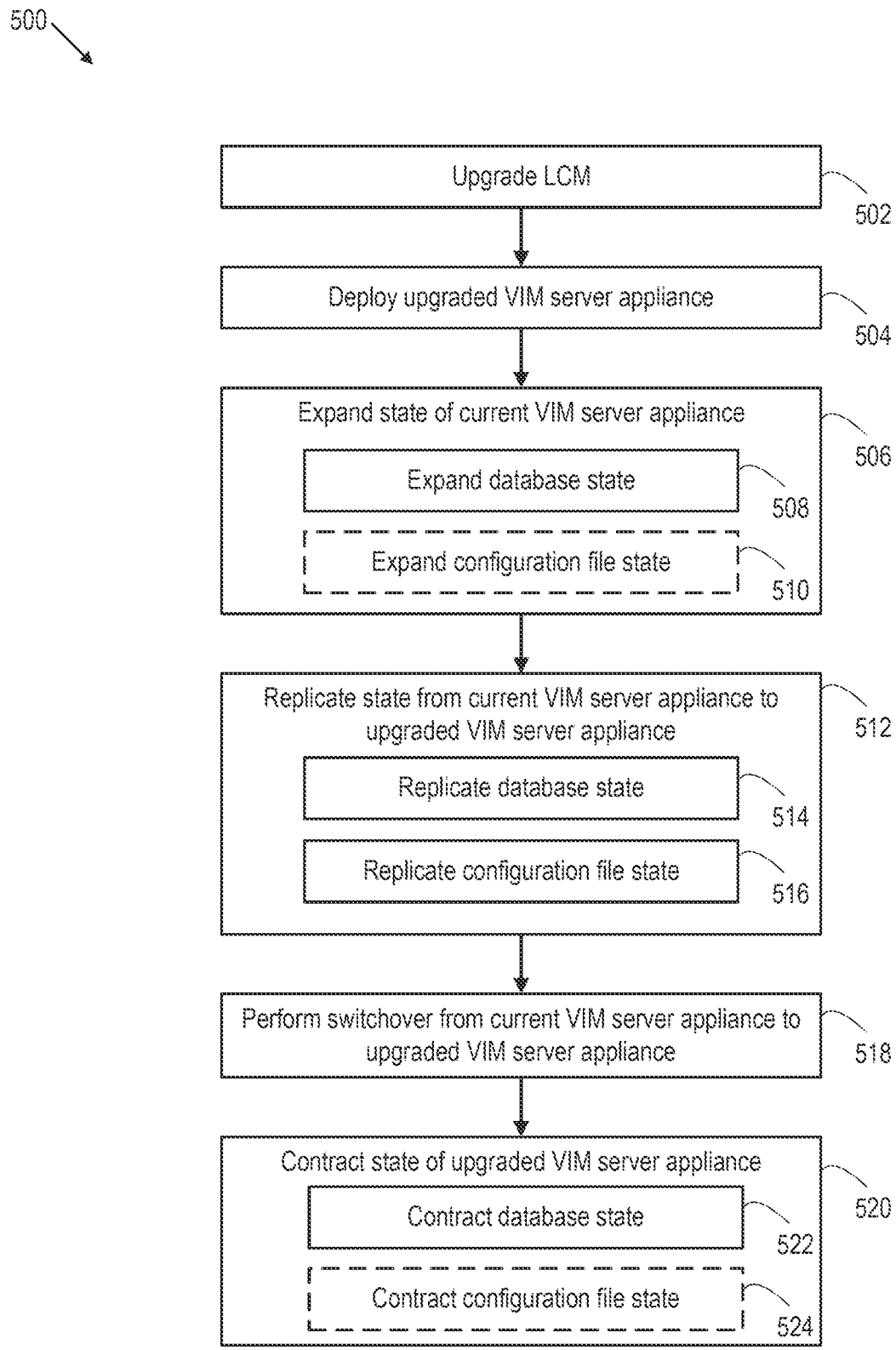
FIG. 5 is a flow diagram depicting a method of upgrading an application according to an embodiment.

FIG. 5 is a flow diagram depicting a method 500 of upgrading an application according to an embodiment. In embodiments, the application is a VM server appliance. Method 500 can be performed by LCM software executing in a VIM server appliance 230 and upgraded VM server appliance 230U. Method 500 begins at step 502, where the LCM software upgrades itself from a current version to a new version. For example, LCM 235 can perform an in-place upgrade while VI services 208 in VIM server appliance 230 continue to execute. Upgrading LCM 235 to the new version allows the new upgrade logic to be present before the start of the application upgrade. After step 502, VIM server appliance 230 executes upgraded LCM 235U.

At step 504, the LCM software deploys an upgraded VIM server appliance. For example, LCM 235U in VIM server appliance 230 deploys upgraded VM server appliance 230U. LCM 235U deploys VIM server appliance 230U such that VIM server appliance 230U is running (e.g., the virtual computing instance is booted and the operating system executing), but VI services 208U other than LCM 235U are inactive and not executing. VI services 208 in VIM server appliance 230 continue to be active and executing.

At step 506, the LCM software expands the state of the current VIM server appliance. For example, LCM 235U expands the state of VIM server appliance 230. The state expansion operation includes expanding database state (step 508) (e.g., expanding the state of database 226 in VIM server appliance 230). An expand/contract pattern that includes expanding the state of database 226 is described further below. Expansion includes making changes to the database schema to add support for the upgraded VI services 208U while maintaining support and compatibility with VI services 208. LCM 235U can also expand configuration file state (step 510). In embodiments, the LCM software can use the same expand/contract pattern for configuration files as used for database state. However, not all configuration files may support the expand/contract pattern (e.g., expansion of configuration file state could break compatibility with VI services 208). Thus, in some embodiments, configuration state is spread across two files, a template file and a user file. All the service defaults for a specific version are included in the template file. User changes are included in the user file. At runtime, the service merges the two files where the user file has precedence. For this type of configuration file, LCM 235U does not perform any changes during the expansion phase.

At step 512, the LCM software replicates state from the current VIM server appliance to the upgraded VIM server appliance. For example, LCM 235U in VIM server appliance 230 cooperates with LCM 235U in VIM server appliance 230U to replicate state of database 226 to database 226U (step 514). LCM 235U can also replicate state of configuration files 227 (step 516). For example, LCM 235U can copy any configuration files 227 that have been expanded to VIM server appliance 230U. If a configuration file has the template/user file pattern, LCM 235U can copy the user file portion to VIM server appliance 230U. The template file portion of such a configuration file is present on VIM server appliance 230U in upgraded form. Replication is performed continuously over time until the switchover phase to ensure no data loss.

At step 518, the LCM software performs switchover from the current VIM server appliance to the upgraded VIM server appliance. For example, LCM 235U in VIM server appliance 230 deactivates VI services 208 (other than itself) and LCM 235U in VIM server appliance 230U activates VI services 208U. In embodiments, switchover includes stopping VI services 208 (other than LCM 235U and database 226), replicating any last state changes (if any), stopping the network on VIM server appliance 230, shutting down VIM server appliance 230, starting the network on VIM server appliance 230U and applying the network identity, and then starting VI services 208U. The switchover phase has a downtime for which the user must plan. However, the switchover phase is the only phase that has downtime in the application upgrade method 500.

At step 520, the LCM software contracts state of the upgraded VIM server appliance. For example, LCM 235U in VIM server appliance 230U can contract state of database 226U to remove deprecated state (step 522). LCM 235U can also contract state of any configuration files 227U that were expanded to remove deprecated state (step 524). Since the deprecated state is unused, it can be removed while VI services 208U are active and executing.

Figure 6:
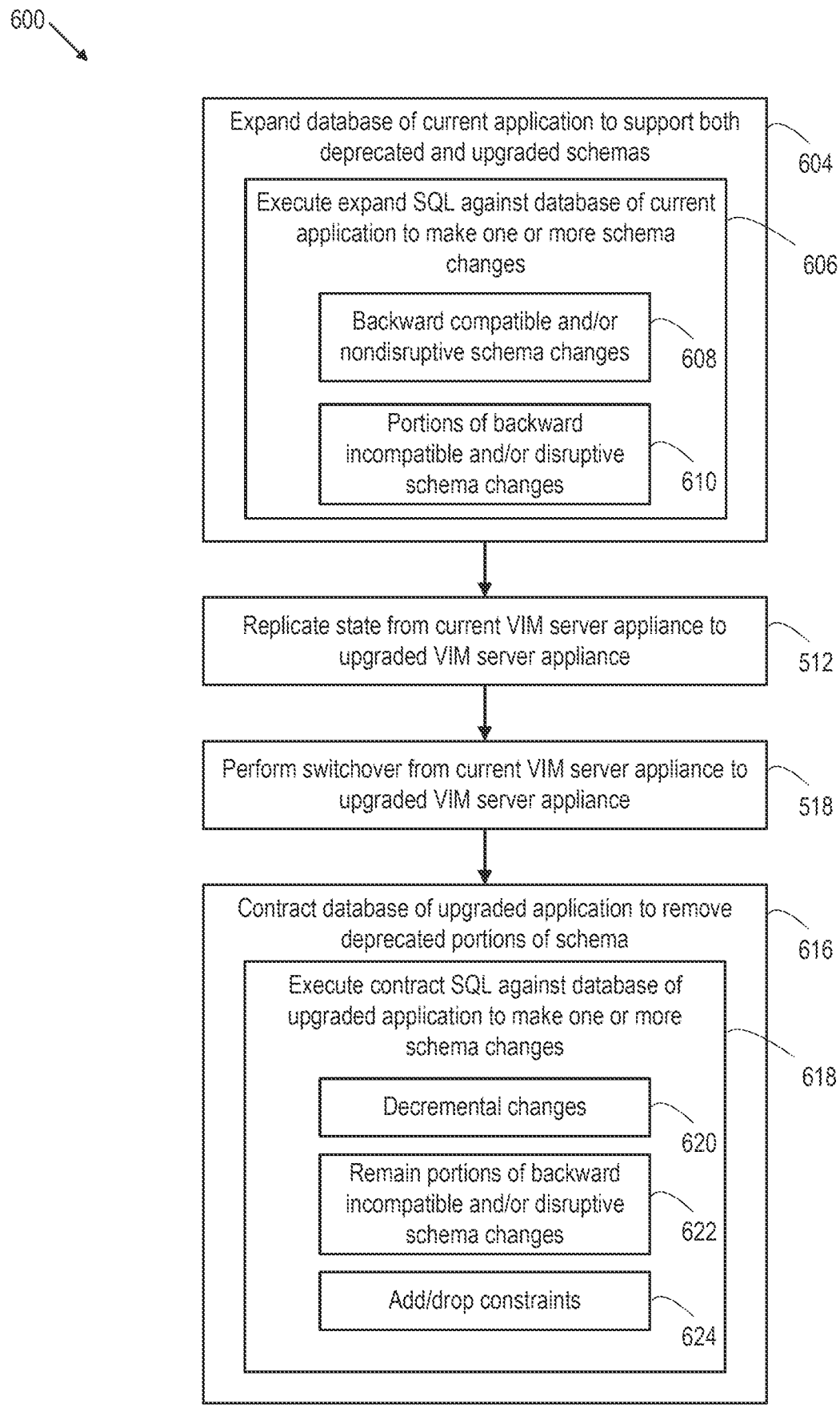
FIG. 6 is a flow diagram depicting a method of expanding and contracting application state during application upgrade according to embodiments.

FIG. 6 is a flow diagram depicting a method 600 of expanding and contracting application state during application upgrade according to embodiments. In embodiments, the application is a VIM server appliance. Method 600 can be performed by LCM software executing in a VIM server appliance 230 and an upgraded VIM server appliance 230U. Method 600 begins at step 604, where the LCM software expands the database of the current application to support both deprecated and upgraded schemas (e.g., database 226 of VIM server appliance 230). The schema of database 226 defines various elements, such as tables, columns, fields, relationships, indexes, triggers, and the like. The LCM software can perform various operations to expand the database schema including the following (described further below):

ALTER TABLE ADD COLUMN
ADD COLUMN WITH DEFAULT VALUE
ADD COMMENT
ADLER TABLE RENAME COLUMN
CREATE INDEX
CREATE TABLE
ALTER TABLE ALTER COLUMN SET DATA TYPE

The LCM software can perform some SQL operations only within the expand phase, perform some SQL operations in either the expand phase or the contract phase, and perform some SQL operations across both the expand and contract phases. At step 606, the LCM software executes expand SQL code against the database of the current application to make one or more schema changes (e.g., expand SQL code 402 against database 226). Some schema changes are backward compatible and/or nondisruptive schema changes (608). Other schema changes are backward incompatible and/or disruptive schema changes (610). For example, the ALTER TABLE ADD COLUMN operation adds a column to an existing table. The CREATE TABLE operation adds a table to the database. The ADD COLUMN WITH DEFAULT VALUE operation adds a column to an existing table and sets a default value for unpopulated rows. These are considered incremental changes that do not affect the compatibility of the state stored in the database (backward compatible changes). These changes are added only during the expand change to ensure that the upgraded application operates as expected after switchover. Note that adding a table and adding a column that does not have a default value are also nondisruptive. Adding a column with a default value, however, requires that the table be locked while the default values are propagated for unpopulated rows. Such an operation is disruptive. An alternative approach to adding a column with default value can be executed during the expand phase without disruption, as described below with respect to FIG. 7.

Figure 7:
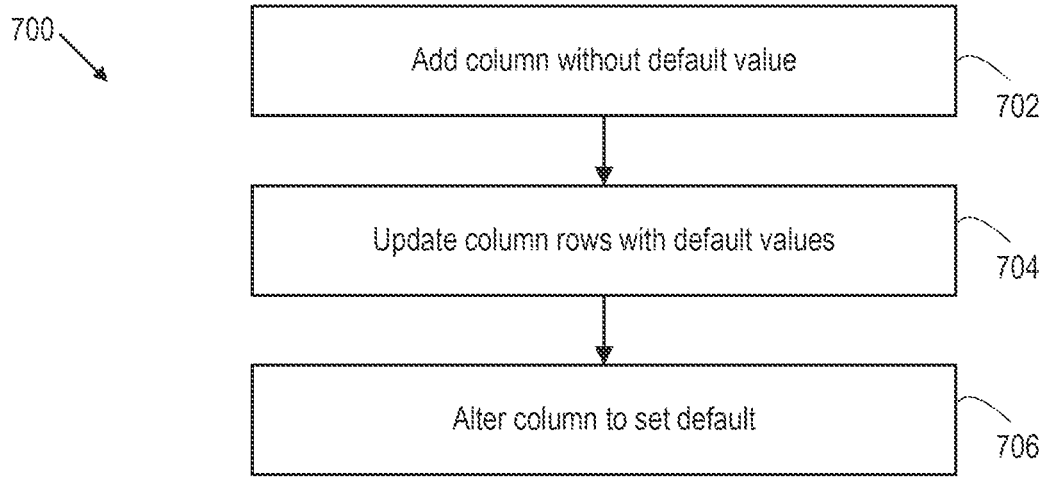
FIG. 7 is a flow diagram depicting a method of adding a column with a default value to a database according to an embodiment.

FIG. 7 is a flow diagram depicting a method of adding a column with a default value to a database according to an embodiment. Method 700 begins at step 702, where the LCM software adds a column to an existing table without the default value. Adding a column without a default value does not require the table to be locked and is a nondisruptive operation. At step 704, the LCM software updates column rows with the default values lazily without locking the table. At step 706, the LCM software alters the added column to set the default value for future added rows.

Returning to FIG. 6, the ADD COMMENT operation, which adds a comment to a table or column, can be performed in either or both the expand phase or the contract phase. The ALTER TABLE RENAME COLUMN operation modifies an existing table by renaming a column therein. This is an example of a schema operation that is performed across both the expand and contract phases as the operation is backward incompatible (i.e., renaming a column would break compatibility with the current application). To maintain compatibility, the rename operation can be split into backward compatible operations performed in the expand phase and the remaining portion is performed in the contract phase.

Figure 8:
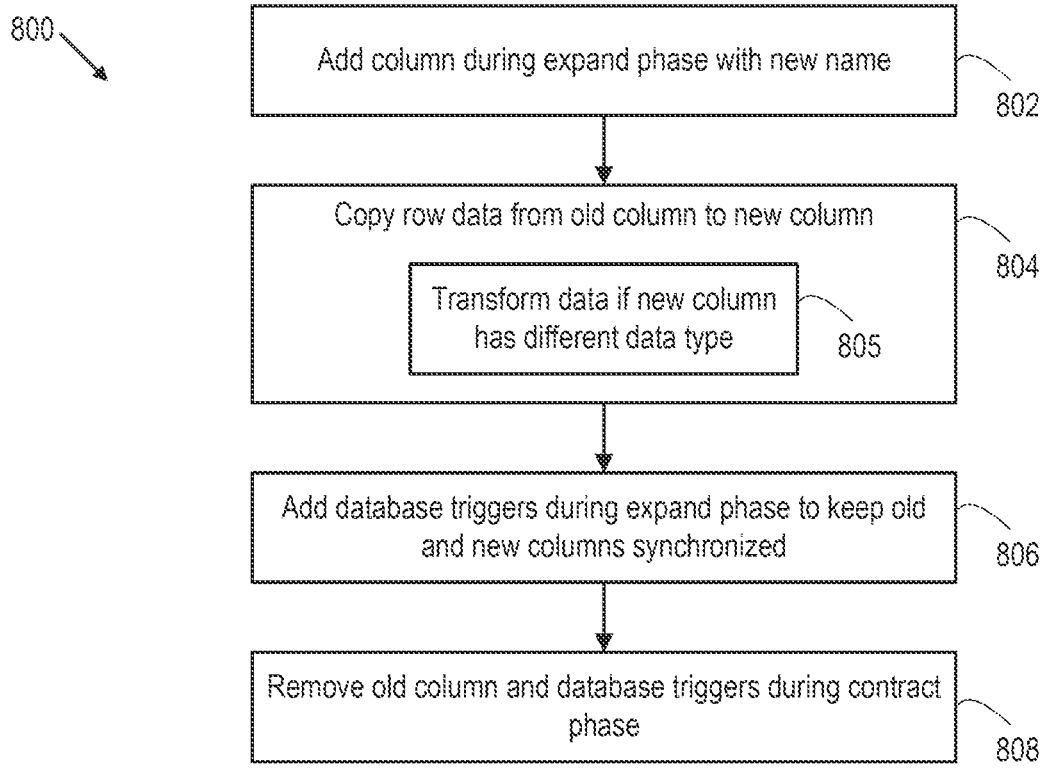
FIG. 8 is a flow diagram depicting a method of renaming a column in a database according to an embodiment.

FIG. 8 is a flow diagram depicting a method 800 of renaming a column in a database according to an embodiment. Method 800 begins at step 802, where the LCM software adds a new column during the expand phase with a new name. At step 804, the LCM software copies the row data from the old column to the new column. At step 806, the LCM software adds database triggers during the expand phase to keep the old and new columns synchronized. Thus, while the current application adds rows or modifies rows of the existing column, those changes are propagated to the new column of which the current application is unaware. Steps 802-806 can be done in a transaction to ensure no data loss. At step 808, the LCM software removes the old column and the database triggers during the contract phase. This completes the operation of renaming a column in an existing table.

The renaming of a table cannot be fully performed during the expand phase as doing such would break compatibility. Such an operation, however, can be avoided entirely or achieved by splitting the operation over several statements. For example, the LCM software can create a new table, backfill the new table from the old table, and create database triggers to keep the old and new tables synchronized. The old table and the database triggers are removed during the contract phase. Thus, renaming a table is similar to renaming a column as described above.

The operation ALTER TABLE ALTER COLUMN SET DATA TYPE can be used to change the data type of a column. This operation would break compatibility of the current application and should be avoided. Rather than explicitly changing the data type of a column, this operation can be performed by using the rename column approach in FIG. 8 but setting a different data type on the new column. The data can be transformed to the new data type during the copy operation from the old column to the new column (805).

Returning to FIG. 6, the operation CREATE INDEX creates an index over a table. The index creation operation can be performed in either the expand phase or the contract phase. To avoid any performance impact, however, index operations can be performed during the contract phase. Creating an index over a table depends on the table size, where larger row count takes more time. Both create and drop index operations require an exclusive lock on the table, meaning the application cannot access the table during the operation. In embodiments, during the contract phase, the LCM software can execute a create index concurrently operation that allows for parallel operations on the table. However, the operation must wait for all transactions using the table to complete before returning.

Method 600 proceeds from step 604 to step 512. At step 512, the LCM software replicates application state as described above in method 500. At step 518, the LCM software executes a switchover from the current application to the upgraded application as described above.

At step 616, after switchover, the LCM software contracts the database of the upgraded application to remove deprecated portions of the schema. The LCM software can also contract configuration files. In embodiments, the LCM software executes contract SQL code against the database of the upgraded application to make one or more schema changes. The schema changes can include decremental changes (620). Additionally, some schema changes can be the remaining portions of backward incompatible changes initiated during the expand phase (e.g., renaming a column) (622). The LCM software can perform various operations to contract the database schema including the following (described further below):

---
DROP INDEX
DROP TABLE
ALTER TABLE DROP COLUMN
ALTER TABLE DROP DEFAULT VALUE
ALTER TABLE ADD CONSTRAINT UNIQUE
ALTER TABLE CHECK CONSTRAINT
ALTER TABLE ADD FOREIGN KEY CONSTRAINT
ALTER TABLE DROP CONSTRAINT
---

The operations DROP TABLE and ALTER TABLE DROP COLUMN drop a table or column, respectively, and are considered decremental changes. These changes are performed during the contract phase and are nondisruptive. The operation DROP INDEX removes an index from a table. The operation ALTER TABLE DROP DEFAULT VALUE removes a default value from a column.

Database constraints disturb the application operations and require special handling. In embodiments, constraint operations are applied during the contract phase (624), as these operations can break compatibility for the old application. The new application must not violate the old constraints. Further, the old application's data might not be compatible with the newly enforced constraint. In such case, constraint validation can fail and the LCM software prompts the user to fix the noncompliant data and retry the constraint operation.

Adding a foreign key constraint requires a shared row exclusive lock on both the altered and reference tables. The operation does not block SELECT queries but does block row modification operations potentially for a long time. To avoid long held locks, the operation for adding a foreign key can be split into two parts: (1) add the foreign key without activating it for the already inserted data (e.g., using a standard query for adding a foreign key but adding "NOT VALID" to the query); and (2) validate the constraint for the already inserted data using an ALTER TABLE VALIDATE CONSTRAINT operation. If the validation fails, the LCM software prompts the user to fix the noncompliant data and retry the constraint operation.

The check constraint operation acquires exclusive access lock and full table scan, which is needed to verify that all the values meet the constraint condition. To avoid long held locks, the LCM software can split the alter into two parts as in the foreign key approach discussed above.

Adding a unique constraint acquires an exclusive access lock and requires a full table scan, which cannot be avoided and can significantly impact the duration of the lock. To avoid long held locks, the LCM software can split the operation into two parts: (1) create a unique index concurrently; and (2) add the unique constraint using the new index, which requires an exclusive access lock for a short time (e.g., UNIQUE USING INDEX).

In embodiments, the LCM software can perform an upgrade from a version 1.0 to a version 2.0. The LCM software first expands the application state to version 2.0 (while maintaining backward compatibility with version 1.0), performs switchover, and then contracts the version 1.0 state. In embodiments, the LCM software supports multi-hop upgrades. For example, the LCM software can perform an upgrade from a version 1.0 to a version 3.0. In such case, the LCM software can expand the application state to version 2.0 and then expand application state again to version 3.0. After switchover, the LCM software can then contract the version 2.0 state followed by contracting the version 1.0 state.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs.

Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of upgrading an application in a software-defined data center (SDDC), comprising:
    performing an in-place upgrade of a lifecycle management software executing in the SDDC from a first version to a second version;
    deploying, by the lifecycle management software, a second appliance, wherein a first appliance executes services of the application at a first version of the application, wherein the second appliance executes services of the application at a second version of the application, and wherein the services of the application in the first appliance are active and the services of the application in the second appliance are inactive;
    expanding, by the lifecycle management software, a state of the first appliance to support both the services of the application at the first version of the application and the services of the application at the second version of the application;
    replicating, by the lifecycle management software, the state of the first appliance to the second appliance;
    performing, by the lifecycle management software, a switchover to stop the services of the application in the first appliance and to start the services of the application in the second appliance; and
    contracting, by the lifecycle management software, a state of the second appliance to remove a portion unused by the services of the application at the second version of the application.

2. The method of claim 1, wherein the lifecycle management software includes a lifecycle manager executing on the first appliance.

3. The method of claim 1, wherein the step of expanding comprises expanding a schema of a database executing in the first appliance to support both the services of the application at the first version of the application and the services of the application at the second version of the application.

4. The method of claim 1, wherein the step of expanding comprises expanding a configuration file of the first appliance to support both a service at the first version of the application and a service at the second version of the application.

5. The method of claim 1, wherein the step of replicating comprises replicating a database executing in the first appliance at the first version of the application to a database executing in the second appliance at the second version of the application.

6. The method of claim 1, wherein the step of replicating comprises copying a state of the application from the first appliance to the second appliance, wherein the state of the application includes a user file portion of a configuration file, and wherein the configuration file includes a template portion at the first version of the application in the first appliance and a template portion at the second version of the application in the second appliance.

7. The method of claim 1, wherein the step of contracting comprises contracting a schema of a database executing in the second appliance to remove a portion unused by the services of the application at the second version of the application.

8. The method of claim 1, wherein a network identity of the application is preserved during the switchover.

9. A non-transitory computer readable medium storing instructions to be executed in a computing device to cause the computing device to perform a method of upgrading an application in a software-defined data center (SDDC), comprising:
    performing an in-place upgrade of a lifecycle management software executing in the SDDC from a first version to a second version;
    deploying, by the lifecycle management software, a second appliance, wherein a first appliance executes services of the application at a first version of the application, wherein the second appliance executes services of the application at a second version of the application, and wherein the services of the application in the first appliance are active and the services of the application in the second appliance are inactive;
    expanding, by the lifecycle management software, a state of the first appliance to support both the services of the application at the first version of the application and the services of the application at the second version of the application;
    replicating, by the lifecycle management software, the state of the first appliance to the second appliance;
    performing, by the lifecycle management software, a switchover to stop the services of the application in the first appliance and to start the services of the application in the second appliance; and contracting, by the lifecycle management software, a state of the second appliance to remove a portion unused by the services of the application at the second version of the application.

10. The non-transitory computer readable medium of claim 9, wherein the lifecycle management software includes a lifecycle manager executing on the first appliance.

11. The non-transitory computer readable medium of claim 9, wherein the step of expanding comprises expanding a schema of a database executing in the first appliance to support both the services of the application at the first version of the application and the services of the application at the second version of the application.

12. The non-transitory computer readable medium of claim 9, wherein the step of expanding comprises expanding a configuration file of the first appliance to support both a service at the first version of the application and a service at the second version of the application.

13. The non-transitory computer readable medium of claim 9, wherein the step of replicating comprises replicating a database executing in the first appliance at the first version of the application to a database executing in the second appliance at the second version of the application.

14. The non-transitory computer readable medium of claim 9, wherein the step of replicating comprises copying a state of the application from the first appliance to the second appliance, wherein the state of the application includes a user file portion of a configuration file, and wherein the configuration file includes a template portion at the first version of the application in the first appliance and a template portion at the second version of the application in the second appliance.

15. The non-transitory computer readable medium of claim 9, wherein the step of contracting comprises contracting a schema of a database executing in the second appliance to remove a portion unused by the services of the application at the second version of the application.

16. A virtualized computing system, comprising:
at least one host having a hardware platform; and
a software platform executing on the hardware platform, the software platform including a lifecycle management software configured to upgrade an application executing in a software-defined data center (SDDC), the lifecycle management software configured to:
perform an in-place upgrade of the lifecycle management software from a first version to a second version;
deploy a second appliance, wherein a first appliance executes services of the application at a first version of the application, wherein the second appliance executes services of the application at a second version of the application, and wherein the services of the application in the first appliance are active and the services of the application in the second appliance are inactive;
expand a state of the first appliance to support both the services of the application at the first version of the application and the services of the application at the second version of the application;
replicate the state of the first appliance to the second appliance;
perform a switchover to stop the services of the application in the first appliance and to start the services of the application in the second appliance; and
contract a state of the second appliance to remove a portion unused by the services of the application at the second version of the application.

17. The virtualized computing system of claim 16, wherein the lifecycle management software includes a lifecycle manager executing on the first appliance.

18. The virtualized computing system of claim 16, wherein the step of expanding comprises expanding a schema of a database executing in the first appliance to support both the services of the application at the first version of the application and the services of the application at the second version of the application.

19. The virtualized computing system of claim 16, wherein the step of expanding comprises expanding a configuration file of the first appliance to support both a service at the first version of the application and a service at the second version of the application.

20. The virtualized computing system of claim 16, wherein the step of replicating comprises replicating a database executing in the first appliance at the first version of the application to a database executing in the second appliance at the second version of the application.

* * * * *